(12) United States Patent
Solomon et al.

(10) Patent No.: US 9,117,219 B2
(45) Date of Patent: Aug. 25, 2015

(54) METHOD AND A SYSTEM FOR SELECTING ADVERTISING SPOTS

(75) Inventors: Amiad Solomon, Bronx, NY (US); Moshe Koppel, Efrat (IE)

(73) Assignee: Peer 39 Inc., Wilmington, DE (US)

( * ) Notice: Subject to any disclaimer, the term of this patent is extended or adjusted under 35 U.S.C. 154(b) by 49 days.

(21) Appl. No.: 12/347,027

(22) Filed: Dec. 31, 2008

(65) Prior Publication Data

US 2009/0171948 A1 Jul. 2, 2009

Related U.S. Application Data

(60) Provisional application No. 61/071,707, filed on May 14, 2008, provisional application No. 61/006,221, filed on Dec. 31, 2007.

(51) Int. Cl.
*G06F 17/30* (2006.01)
*G06Q 30/02* (2012.01)

(52) U.S. Cl.
CPC .......... *G06Q 30/02* (2013.01); *G06F 17/30029* (2013.01); *G06F 17/30864* (2013.01); *G06F 17/30867* (2013.01)

(58) Field of Classification Search
CPC .......... G06Q 30/0277; G06Q 30/0251; G06Q 30/0242; G06Q 30/0255; G06Q 30/0601; G06Q 30/0207; G06Q 30/0241; G06Q 30/0261; G06Q 30/0269; G06Q 30/0276; G06Q 30/0224; G06Q 30/0239; G06Q 30/02; G06F 17/30864; G06F 17/30247; G06F 17/30867; G06F 17/3089; G06F 17/30964; G06F 17/30389; G06F 17/30899; G06F 17/30029

USPC ........ 707/706, 723, 710, 736, 737, 758, 727; 705/14.4
See application file for complete search history.

(56) References Cited

U.S. PATENT DOCUMENTS

| | | | |
|---|---|---|---|
| 5,537,586 A | 7/1996 | Amram et al. | |
| 5,930,788 A | 7/1999 | Wical | |
| 6,144,991 A | 11/2000 | England | |
| 6,826,559 B1 * | 11/2004 | Ponte | .................... 1/1 |
| 6,892,354 B1 * | 5/2005 | Servan-Schreiber et al. | .. 715/733 |
| 7,047,404 B1 | 5/2006 | Doonan et al. | |
| 7,124,093 B1 | 10/2006 | Graham et al. | |
| 7,228,493 B2 | 6/2007 | Kosak et al. | |
| 7,296,064 B2 | 11/2007 | Yoon et al. | |
| 7,302,404 B2 | 11/2007 | Solomon | |
| 7,320,031 B2 * | 1/2008 | Konig et al. | .............. 709/224 |
| 7,346,606 B2 | 3/2008 | Bharat | |
| 7,483,891 B2 * | 1/2009 | Liu et al. | ............... 1/1 |
| 7,580,926 B2 * | 8/2009 | Kapur et al. | .......... 1/1 |
| 7,647,299 B2 * | 1/2010 | Harik | .............. 707/999.003 |

(Continued)

OTHER PUBLICATIONS

Abadpour et al. "Pixel-Based Skin Detection for Pornography Filtering", Iranian Journal of Electrical & Electronic Engineering, 25 P., 2005.

(Continued)

*Primary Examiner* — Thanh-Ha Dang (57) ABSTRACT

A method for selecting advertisement spots that comprises providing parameters, each associated with one or more references to web documents which are retrieved by it, receiving a description of a product, identifying a match between the received description and at least one of the parameters, and generating a list of references which are associated with the at least one parameter.

27 Claims, 6 Drawing Sheets

(56) References Cited

U.S. PATENT DOCUMENTS

| | | | |
|---|---|---|---|
| 7,653,627 B2* | 1/2010 | Li et al. | 707/999.007 |
| 7,680,796 B2* | 3/2010 | Yeh et al. | 707/724 |
| 7,693,830 B2* | 4/2010 | Guha | 707/999.003 |
| 7,711,743 B2* | 5/2010 | Cavagnaro et al. | 707/769 |
| 7,716,199 B2* | 5/2010 | Guha | 707/706 |
| 7,725,464 B2* | 5/2010 | Grubb et al. | 707/723 |
| 7,734,624 B2* | 6/2010 | Anderson et al. | 707/727 |
| 7,827,060 B2* | 11/2010 | Wright et al. | 705/14.4 |
| 7,827,158 B2 | 11/2010 | Hayakawa | |
| 7,831,586 B2* | 11/2010 | Reitter et al. | 707/709 |
| 7,987,194 B1 | 7/2011 | Walker et al. | |
| 7,991,806 B2 | 8/2011 | Broder et al. | |
| 7,996,282 B1* | 8/2011 | Scott et al. | 705/27.2 |
| 8,001,105 B2* | 8/2011 | Bolivar et al. | 707/709 |
| 8,156,002 B2 | 4/2012 | Van Zwol et al. | |
| 8,296,335 B2 | 10/2012 | Bouve et al. | |
| 8,326,686 B2* | 12/2012 | Datar et al. | 705/14.49 |
| 8,412,650 B2 | 4/2013 | Takamatsu | |
| 8,538,836 B1* | 9/2013 | Scott et al. | 705/27.2 |
| 2001/0043364 A1 | 11/2001 | Messner et al. | |
| 2001/0049620 A1 | 12/2001 | Blasko | |
| 2002/0083123 A1 | 6/2002 | Freedman et al. | |
| 2002/0129063 A1 | 9/2002 | Kosak et al. | |
| 2002/0138331 A1 | 9/2002 | Hosea et al. | |
| 2003/0140311 A1 | 7/2003 | Lemon et al. | |
| 2003/0172005 A1* | 9/2003 | Hellal et al. | 705/27 |
| 2004/0054589 A1 | 3/2004 | Nicholas et al. | |
| 2004/0059708 A1 | 3/2004 | Dean et al. | |
| 2004/0093327 A1* | 5/2004 | Anderson et al. | 707/3 |
| 2005/0033641 A1* | 2/2005 | Jha et al. | 705/14 |
| 2005/0120390 A1 | 6/2005 | Nonoyama | |
| 2005/0278620 A1* | 12/2005 | Baldwin et al. | 715/513 |
| 2006/0010073 A1 | 1/2006 | Fisher et al. | |
| 2006/0074748 A1* | 4/2006 | Kline et al. | 705/14 |
| 2006/0287920 A1* | 12/2006 | Perkins et al. | 705/14 |
| 2006/0293951 A1* | 12/2006 | Patel et al. | 705/14 |
| 2007/0005417 A1 | 1/2007 | Desikan et al. | |
| 2007/0016469 A1 | 1/2007 | Bae et al. | |
| 2007/0027772 A1* | 2/2007 | Chou | 705/14 |
| 2007/0038614 A1* | 2/2007 | Guha | 707/4 |
| 2007/0050389 A1* | 3/2007 | Kim et al. | 707/101 |
| 2007/0050393 A1 | 3/2007 | Vogel et al. | |
| 2007/0061203 A1* | 3/2007 | Ellis et al. | 705/14 |
| 2007/0079327 A1* | 4/2007 | Khoo et al. | 725/35 |
| 2007/0112629 A1* | 5/2007 | Solomon et al. | 705/14 |
| 2007/0156520 A1* | 7/2007 | Sharma | 705/14 |
| 2007/0208621 A1* | 9/2007 | Park et al. | 705/14 |
| 2007/0208728 A1 | 9/2007 | Zhang et al. | |
| 2007/0214042 A1* | 9/2007 | Dominowska | 705/14 |
| 2007/0233556 A1* | 10/2007 | Koningstein | 705/14 |
| 2007/0244750 A1* | 10/2007 | Grannan et al. | 705/14 |
| 2007/0288431 A1* | 12/2007 | Reitter et al. | 707/3 |
| 2008/0028100 A1 | 1/2008 | Adelman et al. | |
| 2008/0086356 A1* | 4/2008 | Glassman et al. | 705/10 |
| 2008/0183742 A1* | 7/2008 | Kapur | 707/102 |
| 2008/0195461 A1 | 8/2008 | Li et al. | |
| 2008/0235085 A1 | 9/2008 | Kovinsky et al. | |
| 2008/0235187 A1* | 9/2008 | Gade et al. | 707/3 |
| 2008/0249855 A1* | 10/2008 | Collins et al. | 705/14 |
| 2008/0281705 A1 | 11/2008 | Solomon | |
| 2008/0288341 A1 | 11/2008 | Garbe et al. | |
| 2009/0019008 A1* | 1/2009 | Moore et al. | 707/3 |
| 2009/0024718 A1* | 1/2009 | Anagnostopoulos et al. | 709/218 |
| 2009/0063229 A1* | 3/2009 | Coladonato et al. | 705/7 |
| 2009/0063491 A1 | 3/2009 | Barclay et al. | |
| 2009/0076886 A1* | 3/2009 | Dulitz et al. | 705/10 |
| 2009/0235187 A1* | 9/2009 | Kim et al. | 715/760 |
| 2009/0265243 A1* | 10/2009 | Karassner et al. | 705/14.54 |
| 2010/0088321 A1 | 4/2010 | Solomon et al. | |
| 2010/0121790 A1 | 5/2010 | Klinkott | |
| 2010/0125502 A1 | 5/2010 | Solomon et al. | |
| 2010/0161385 A1 | 6/2010 | Karypis et al. | |
| 2010/0185513 A1* | 7/2010 | Anderson et al. | 705/14.49 |
| 2010/0191574 A1* | 7/2010 | Ziemann | 705/10 |
| 2011/0055195 A1* | 3/2011 | Reitter et al. | 707/710 |
| 2012/0078715 A1 | 3/2012 | Li et al. | |
| 2012/0284119 A1* | 11/2012 | Hu et al. | 705/14.52 |
| 2012/0303446 A1 | 11/2012 | Busch | |
| 2013/0304572 A1* | 11/2013 | Axe et al. | 705/14.49 |

OTHER PUBLICATIONS

Argamon et al. "Automatically Profiling the Author of an Anonymous Text", 13 P.

Liang et al. "Detecting Pornographic Images", Asia Pacific Institute of Information Technology, Kuala Lumpur, Malaysia, 6 P.

Response Dated Jan. 3, 2012 to Official Action of Aug. 5, 2011 From the US Patent and Trademark Office Re. U.S. Appl. No. 12/551,603.

Official Action Dated Aug. 5, 2011 From the US Patent and Trademark Office Re. U.S. Appl. No. 12/551,603.

Restriction Official Action Dated Sep. 5, 2012 From the US Patent and Trademark Office Re. U.S. Appl. No. 12/615,282.

Restriction Official Action Dated Mar. 28, 2012 From the US Patent and Trademark Office Re. U.S. Appl. No. 12/615,279.

Official Action Dated Aug. 1, 2012 From the US Patent and Trademark Office Re. U.S. Appl. No. 12/615,279.

Official Action Dated Sep. 3, 2013 From the US Patent and Trademark Office Re. U.S. Appl. No. 12/615,282.

Advisory Action Before the Filing of an Appeal Brief Dated Nov. 26, 2013 From the US Patent and Trademark Office Re. U.S. Appl. No. 12/615,282.

Official Action Dated May 29, 2013 From the US Patent and Trademark Office Re. U.S. Appl. No. 12/615,279.

Official Action Dated Jan. 4, 2013 From the U.S. Appl. No. 12/615,282.

Advisory Action Before the Filing of an Appeal Brief Dated Aug. 22, 2013 From the US Patent and Trademark Office Re. U.S. Appl. No. 12/615,279.

Official Action Dated Dec. 19, 2014 From the US Patent and Trademark Office Re. U.S. Appl. No. 12/615,279.

Official Action Dated Sep. 19, 2014 From the US Patent and Trademark Office Re. U.S. Appl. No. 12/615,282.

Official Action Dated Aug. 21, 2014 From the US Patent and Trademark Office Re. U.S. Appl. No. 12/551,603.

Official Action Dated Mar. 9, 2012 From the US Patent and Trademark Office Re. U.S. Appl. No. 12/551,603.

* cited by examiner

METHOD AND A SYSTEM FOR SELECTING ADVERTISING SPOTS

RELATED APPLICATIONS

This application claims the benefit of priority of U.S. Provisional Patent Applications No. 61/071,707 filed May 14, 2008 and 61/006,221 filed 31 Dec. 2007, the contents of which are incorporated herein by reference.

FIELD AND BACKGROUND OF THE INVENTION

The present invention, in some embodiments thereof relates to a system and a method for advertising and, more particularly, but not exclusively, to a system and a method for advertising according to characteristics provided by an advertiser.

Internet based advertising is an important mechanism that enterprises use to communicate with customers. With the introduction of the Internet, new advertising and communication possibilities with customers have been created, which offer the potential of greatly enhanced and more effective advertising techniques for businesses.

Online visitors to web documents on the Internet may be directed to a company's web document in several ways including, for example, paid-for advertisements that link to a merchants web document or links presented in the natural search results presented by a search engine, such as Yahoo!™, MSN™, or Google™ in response to a visitor's language query.

Consumers are showing an increasing preference for using the Internet when searching for purchases, as compared to traditional media outlets. These conclusions are supported by the increasing demand for, and proliferation oft high-speed Internet connections throughout the United States and worldwide. As the Internet grows in popularity and felt necessity, the volume of businesses advertising and communicating over the Internet promises to increase in a corresponding manner.

In light of this progression, a number of systems and methods have been developed for enhancing the Internet based advertising and to match advertisements to the viewer.

For example, U.S. Pat. No. 7,136,871, filed on Nov. 21, 2001, describes a system, including a planning module, a control module, and a receiver module, configured to schedule display of one or more advertising impressions of available advertising inventory. The planning module enables scheduling a requested quantity of advertising impressions in accordance with target criteria. Further, the planning module enables selecting an advertising impression goal for advertisement, assigning an advertising type and defining a weight for the advertisements. The control module receives the schedule, the advertising type and the defined weights and generates one or more metadata files that contain target criteria, advertising type and weights for the advertisements. The one or more metadata files, with the advertisements, are delivered to the receiver module that is configured to define a display frequency for the advertisements which based upon one or more of the metadata files. The receiver module selectively displays advertisement content associated with the advertisements to achieve the advertising impression goal.

SUMMARY OF THE INVENTION

According to an aspect of some embodiments of the present invention there is provided a method for selecting advertisement spots. The method comprises providing a plurality of parameters each associated with at least one reference to an advertising spot associated with a web document retrieved by it, receiving a description of a product, identifying a match between the description and at least one of the plurality of parameters, and generating a list of references, each member of the list being associated with the at least one parameter.

Optionally, the plurality of parameters comprises a plurality of search parameters.

Optionally, the product is selected from a group consisting of: a product, a service, a website, a movie, and a show.

Optionally, the at least one reference comprises at least one member of a group consisting of: a reference to a web document linking to the web document and a reference to a web document linked from the web document.

Optionally, the providing comprises, for each the parameter, estimating a relevancy weight of each the at least one reference, the generating comprising generating the list of references according to respective the relevancy weights.

More optionally, the providing further comprises tracing a plurality of referrers to a plurality of web documents and weighting each the web document according to the tracing. In such an embodiment, the estimating is performed according to the weighting.

More optionally, the providing further comprises analyzing the content of a plurality of web documents, wherein the estimating is performed according to the analyzing.

Optionally, the providing further comprises tracing a plurality of referrers to a plurality of web documents and selecting the plurality of parameters according to the tracing.

Optionally, the web document is selected from a group consisting of: a webpage, a video file, an audio file, a podcast, a word processor document, a portable document format (PDF) document, an excel spreadsheet document, an extensible markup language (XML) page, a hypertext markup language (HTML) page, and a content file being accessible via a communication network.

Optionally, the providing comprises clustering a plurality of websites in a plurality of clusters each associated with at least one of the plurality of parameters, the cluster being identified from the plurality of clusters according to a match between the description and the at least one associated parameter.

More optionally, each the cluster indicating a product type, each the reference being clustered according to a match between the respective at least one parameter and a respective the product type, the selecting being perform from the plurality of clusters.

Optionally, the providing further comprises providing a list of a plurality of undesirable content elements, the identifying comprises identifying a match between the plurality of undesirable content elements and at least one content element of each the web document.

More optionally, the undesirable content element is selected from a group consisting of: an objectionable word, an objectionable paragraph, an objectionable image, an objectionable phrase, and an objectionable word combination.

More optionally, the method further comprises identifying at least one additional undesirable content element in the each the web document by analyzing a sub-group of each the web document, each member of the sub-group having at least one of the plurality of undesirable content elements, the identifying being performed according to a match between the at least one additional undesirable content and at least one content element of each the web document.

According to an aspect of some embodiments of the present invention there is provided a method for selecting advertisement spots. The method comprises providing a plurality of references of a plurality of web documents, each the web document being retrieved in response to at least one parameter, receiving a description of a product, selecting a cluster of the plurality of references each according to a match between the description and respective the at least one parameter, and outputting the cluster to allow advertising the product in at least one member thereof.

According to an aspect of some embodiments of the present invention there is provided a system for selecting advertisement spots. The system comprises a repository comprising a plurality of search parameters each being associated with at least one reference to a web document retrieved by it, a receiving unit configured for receiving a description of a product, a matching unit configured for identifying a match between the description and at least one of the plurality of search parameters, and an output unit configured for generating a list of references according to the match, each member of the list being associated with the at least one search parameter.

Optionally, the method further comprises at least one tracing module configured for tracing a plurality of references to a plurality of web documents and weighting each one of the web documents according to the tracing, wherein the list of references is generated according to the weighting.

Optionally, the method further comprises a content analysis module configured for analyzing a content of the web document, the matching unit being configured for identifying a match between at least one of the description and the at least one search parameter and the analyzed content.

Optionally, the method further comprises a reputation protection module configured for probing a plurality of undesirable content elements in the web document, the output module being configured for filtering the list of references according to the probing.

More optionally, the repository maps an ad exchange network.

More optionally, the output unit being configured for forwarding the list of references to an advertising server for allowing the advertising of the product in at least one web document referred to by the list of references.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a system and a method for advertising and, more particularly, but not exclusively, to a system and a method for advertising according to characteristics provided by an advertiser.

Figure 1:
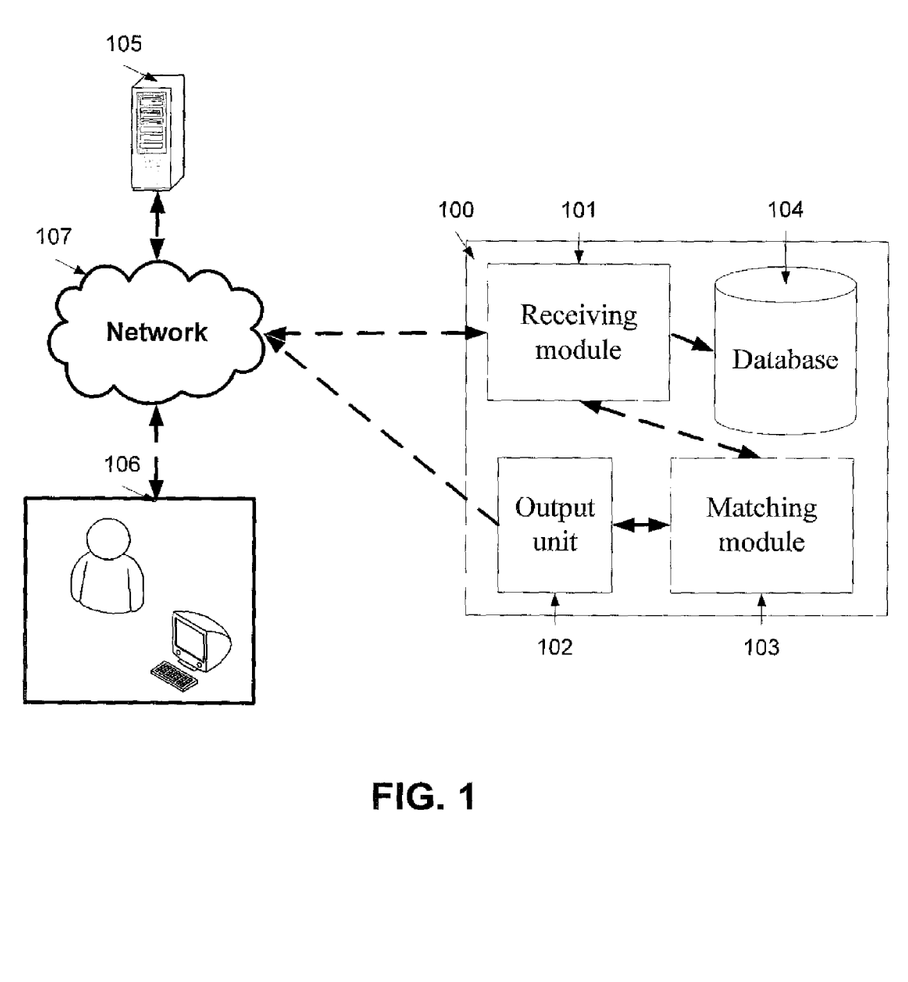
FIG. 1 is a schematic illustration of a system for selecting advertisement spots, according to some embodiments of the present invention.
Figure 2A:
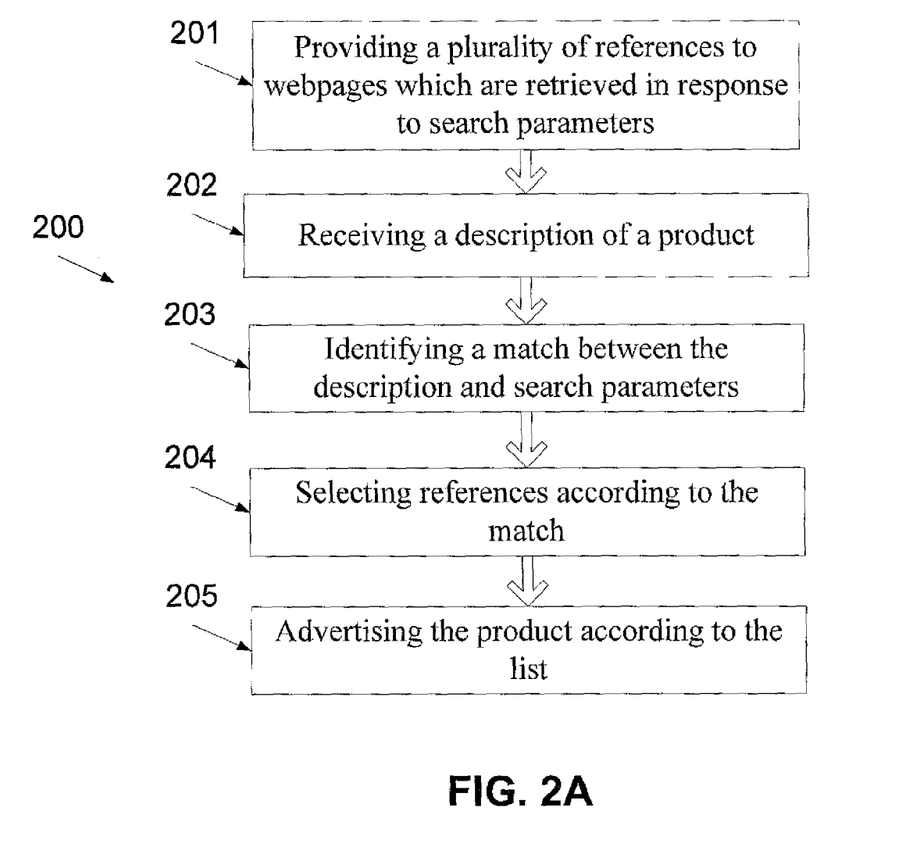
FIG. 2A is a flowchart of a method for advertising a product, according to some embodiments of the present invention.

As commonly known, a network user that search the Internet for a product usually accesses a general search engine, such as Google™, Yahoo™, and MSN Live™ or a local search engine, such as a search engine of a certain website and/or a number of websites, optionally related. The search parameters, which are used by the accessing network user for accessing a certain web document, indicate what the user is expecting to find in the accessed web document. Some embodiments of the preset invention, such as the system that is depicted in FIG. 1 and the method that is depicted in FIG. 2A, may utilize this information for creating clusters of references to web documents which are retrieved as response entries to similar and/or identical search parameters. The clusters may allow advertisers and/or advertising systems to promote and/or to enhance the exposure of internet users to their products, optionally as further described below.

According to some embodiments of the present invention, there is provided a system and a method for advertising to targeted users which are defined as users which use specific search parameters for searching a specific product and/or service. Optionally, advertisement spots are selected according to search parameters that have been used by browsing users for accessing related web documents and not only according to the profile of the user, the content of the web document, and/or the publisher of the web document.

According to some embodiments of the present invention, there is provided a system and a method for method for selecting advertisement spots. The method comprises providing a plurality of references of a plurality of web documents, receiving a description of a product, and selecting a cluster of said plurality of references. Each reference is selected according to a match between the received description and one or more search parameters which have been used to retrieve one or more the web documents. The method further comprises outputting the cluster to allow advertising the product in at least one member thereof.

According to some embodiments of the present invention, clusters advertisement spots, such as webpages and/or any document that is hooked up to a computer network, such as the Internet, available on line may be created for allowing an advertiser to publish an advertisement to a service and/or a product in a number of advertisement spots which are accessed by similar and/or substantially similar search queries. The web documents are clustered according to aggregated search referral queries.

According to some embodiments of the present invention there is described a method a system for advertising according to the content of communication content messages, such as short message service (SMS) messages, instant messaging (IM) messages, multimedia messaging service (MMS) messages, and wireless application protocol (WAP) messages. The method comprises providing a plurality of content identifiers, such as words and/or paragraphs which may appear in the communication content messages and a description of a product, for example as outlined above. Then, a match between the description and at least one of the plurality of content identifiers is found. The match allows sending promotional content pertaining to the product to a sender and/or a receiver of a communication content message that includes the matched content identifier. For example a sender of an SMS message which is related to a music player may receive an SMS that includes a discount coupon for such a music player.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a system for selecting advertisement spots, according to some embodiments of the present invention. As used herein an advertisement spot means an advertisement or series of advertisements for a product including but not limited to a banner advertisement, an audio advertisement, a video advertisement, a splash page advertisement, a pop-up advertisement, a flash advertisement, a request for an advertisement space, a floating advertisement, a promotional message, such as SMS messages, IM messages, MMS messages, and WAP messages, a promotional content that is added to a message, such as an SMS message, an IM message, an MMS message, and a WAP message or any other advertisement spot that is associated with a certain web document. The system 100 comprises and/or connected to a database 104 that hosts a plurality of references, such as uniform resource locators (URLs) to web documents or to advertising spots in web documents. It should be noted that the database 104 may include a plurality of repositories, which may be distributed over a plurality of hosting units, such as servers. For example, webpages and/or websites of an ad exchange network may be mapped according to an analysis, such as a statistical analysis, of related page impressions, as further described below. As used herein, a web document means a webpage, a video file, an audio file, such as a podcast, a WORD document, a portable document format (PDF) document, an excel spreadsheet document, an extensible markup language (XML) page, a hypertext markup language (HTML) page, an Internet page, or any other content file that is accessible via a communication network. Optionally, the web documents are related to different publishers. As used herein, a publisher or a publishing entity means a website, a web-based database, or any other entity that supplies advertising services and/or space. Each one of the references is stored in association with search parameters of a search query that has been used for retrieving it or related web documents, such as linking web pages and linked webpages which have been selected according to such search parameters, optionally as further described below. The system 100 further comprises a receiving module 101 for receiving a description of a product, a matching module 103 for generating a list that includes references from the database 104, and an output unit 102 for delivering the list to allow the presenting and/or associating of an advertisement to a certain product in one or more referred advertising spots. As used herein a product means a product, a service, a website, a show, and/or a movie and presenting means, playing, displaying, and/or activating the advertisement.

Reference is now also made to FIG. 2A, which is a flowchart of a method for advertising a product, according to some embodiments of the present invention. First, as shown at 201, references of web documents are provided, optionally as records in a database, for example as shown at 104. As described above, the references are associated with search parameters which have been used for retrieving the web documents they refer to or for retrieving related web documents. In some embodiments of the present invention, the clusters are tagged using cluster tags. Each one of the references is associated with one or more cluster tags, such as cameras, computers, clothing, movies, services, law, medical, communication, cellular, and the like. Optionally, each cluster tag is associated with a number of related search parameters which are used to retrieve the references which are associated therewith, for example as described in FIG. 3. The cluster tags may be used to identify a cluster of associated references of web documents which are retrieved in response to common and/or similar search parameters and/or related web documents. Optionally, each cluster tag is associated with a number of search parameters that indicate that a browsing user is looking for a product that is related to the cluster tag. For example, search parameters such as camera, Sony™, resolution, 2 MB, 5 MB, optical zoom, and memory are associated with the cluster tag "cameras" and search parameters such as lawyer, litigation, negligence, suit court, legal help, legal assistance, and advocate memory are associated with the cluster tag law services. Optionally, the associated search parameters includes common misspelled keywords which are related to the cluster tag, keywords which describe accessories to a family of products that is related to the cluster tag, and the like.

Optionally the system 100 comprises and/or connected to one or more tracing modules which are used for analyzing page impressions for identifying the search parameters which are used for retrieving the referred web documents. Optionally, in order to identify search parameters which have been used to retrieve a certain referred website, the tracing module probes the URLs of referrers, such as a hypertext transfer protocol (HTTP) referrers to the certain website. If the URL of the referrer is originated from a result entry of a response page, which is received in a search that is based on a certain search query, the URL may include the search parameters of the certain search query. For example, when the result entry is selected from a search result page of the search engine Google™ which is generated in response to the search query "MP3 player with good battery life".

In some embodiments of the present invention, the tracing module extracts search parameters from a referrer that is sent with an HTTP request that is forwarded to a web server that hosts a related web document. The referrer is sent by a browser program, such as a Microsoft explorer™, as part of the HTTP request. The HTTP request, which is a part of HTTP, is optionally in a form of a header that may be referred to as an HTTP-REFERRER. The tracing module may extract the search parameters and use it as outlined above. It should be noted that method for extracting search parameters, such as search words, are well known and will not, therefore, be described here in detail. Such a referrer allows the tracing module to extract the search parameters which are embedded in the referrer URL and to match between them and the search parameters which are associated with clusters tags in the database 104. The match allows associating between different cluster tags and references.

It should be noted that the tracing of page impressions may be performed by independent entities, such as an ad exchange network. In such an embodiment, the system 100 may analyze the information that is gathered on the one or more of the web documents and store it in the database 104.

Figure 3:
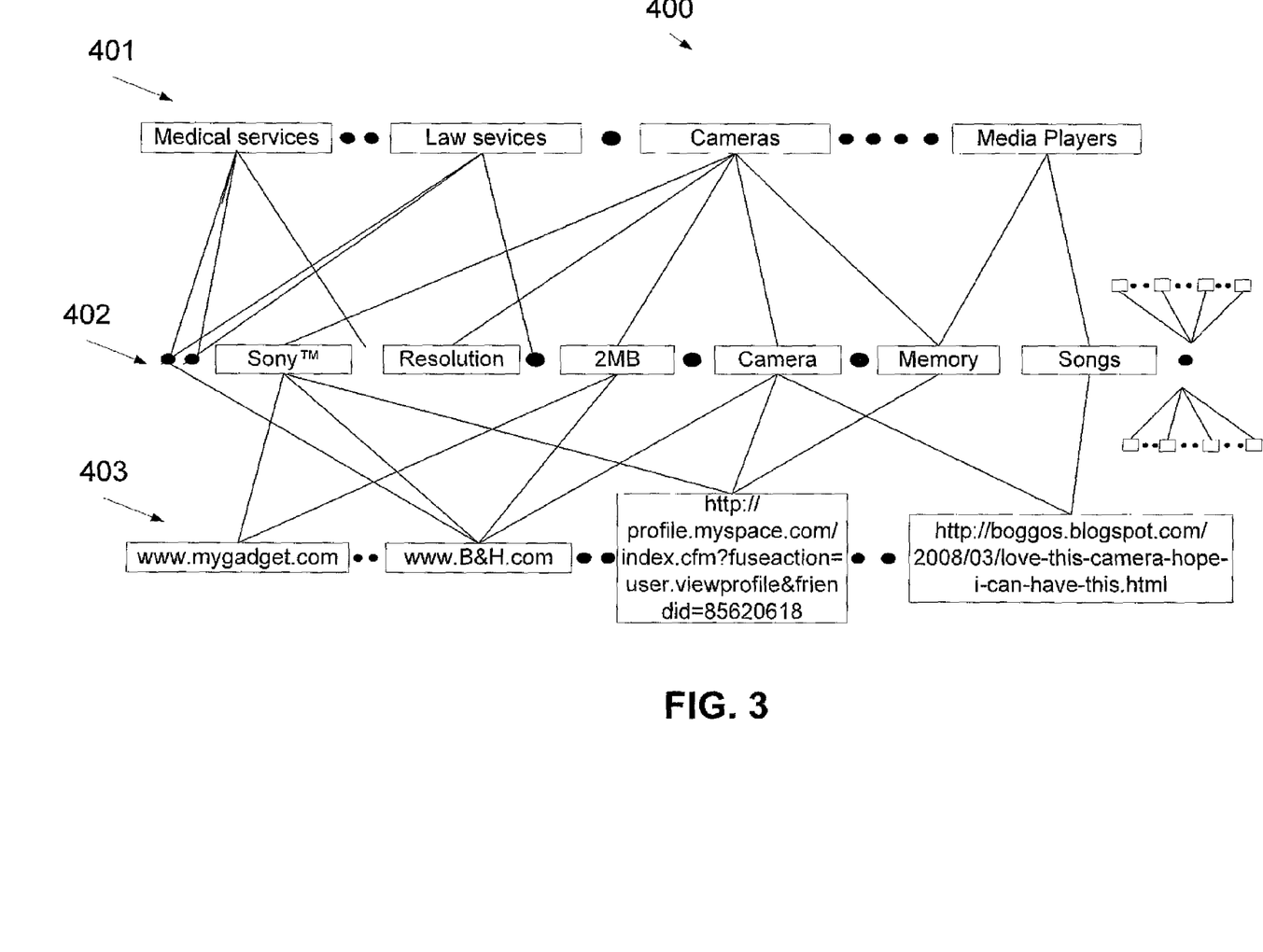
FIG. 3 is a schematic illustration of a number of mapped records which are stored in a database such as the database of the system of FIG. 1, according to some embodiments of the present invention.

Reference is now also made to FIG. 3, which is a schematic illustration of a number of mapped records 400 which are stored in the database 104 according to some embodiments of the present invention. As described above, the database may store cluster tags 401 which are associated with related search parameters 402.

As shown at FIG. 3, the cluster tags 401 are divided according to characterizing search parameters 402. A characterizing search parameter, such as a keyword, may characterize a specific product, a product with a specific set of properties and/or with a market that is similar to a specific set of properties and/or the market of the specific product. For example, a cluster that is designed to include a bundle of references which are referred to from result entries which are associated with one or more search parameters which are related to the motivation "ordering a ski vacation", such as ski, resort, skiing, snow, ski-pass, and/or all inclusive.

Optionally, the search parameters 402 are associated with references of advertising spots at web documents 403 which are retrieved according thereto and/or with advertising spots at web documents which are related to these web documents, for example web documents which are linked thereto and/or therefrom and the like. Optionally, the associated references are selected according to statistic tracing that is based on actual search parameters that have been used by a user during browsing for information and not only according to the content and/or the publisher of the web documents. In such a manner, the references are selected, and optionally weighted, as described below, according to empiric data that reflects actual user behavior and not according to the content and/or estimated target audience of the web documents that may or may not attract potential customers that actually look for the advertised products. As shown at 401, each cluster tag may be associated, optionally via the search parameters, with references 403 to web documents, such as selling sites, blogs, personal webpage, and/or any other webpage or site that may be referred to in a response to the search query. Optionally, the receiving module 101 is configured for allowing the system operator and/or an advertiser to select one or more of the cluster tags. The system 100 is designed to associate between one or more advertisements of the advertiser and/or one or more advertisements selected by the system operator and advertisement spots at references which are associated with the selected cluster. For example, an advertiser of a law service may select a law service cluster for advertising her firm. The advertiser optionally provides an advertisement and the advertisement is associated with advertisements spots of the web documents which are referred by references associated with the cluster tag "legal services". In such a manner, advertisement spots, which are located at websites accessed from a result page that is retrieved in response to a search query that includes search parameters for legal services, are associated with the provided advertisement. As depicted in FIG. 3, different cluster tags may be associated with the same search parameters and/or with the same references.

The system 100 allows the advertiser to advertise, optionally simultaneously, in a plurality of web documents, such as webpages, which are selected according to the search parameters which have been used for retrieving them. The advertisements may be aimed, on the basis of search parameters analysis, at one specific subsection of the market, such as potential consumers which are interested in high quality audio receivers. By selecting references which have been clustered according to related referring search parameters, the advertiser can target the advertised group of browsing users, optionally without analyzing the content of the referred web documents.

Optionally, the tracing module clusters each reference according to a weighted function that takes into account statistic information about the prevalence of search parameters which have been used for retrieving result entries that refers thereto search parameters of the search queries that have been used for retrieving them. In such a manner, the cluster tag may be associated with references which have been retrieved in response to search parameter associated therewith more than a predefined number of times.

Optionally, the system 100 is connected to a content analysis module which is designed to analyze the content of the referred web documents, for example as described in U.S. Provisional Patent Application No. 61/006,221, filed on Dec. 31, 2007, which is incorporated herein by reference. Optionally, the content analysis module weights each web document according to the aforementioned content analysis and the matching module 103 is based on the weighting for the content analysis. Optionally, the clustering is based on a match between the output of the content analysis and the output of the tracing module. In such an embodiment, the search parameters reflects the content that is provided in the web documents and therefore increase the chances that the browsing user will spend more time reading and/or probing the content that is displayed in association with the advertising. For example, a webpage that the content analysis thereof indicates that it contains data that is related to sport shoes and has been tagged as data that is retrieved in response to the search parameter "sport and shoes" increases the likelihood that the user who submits the search parameters spends a relativity long period on reading it. In such a manner, the advertisement has a longer average exposure period than the average exposure period of an advertisement in a web document that is retrieved in response the same search parameters however includes content that is not related to the search parameters, for example a web page that includes content of pets that chew sport shows.

Optionally, the clustering is performed with respect to an outcome of a weighted function that takes into account statistic information about the prevalence of page impressions that reflects search parameters which have been used for retrieving result entries that refer thereto.

Optionally, each connection between a search parameter and a reference is weighted, optionally according to the number of times that the search parameter has been used for retrieving it. Optionally, the weight is dynamic and updated according to the current visiting number. Optionally, the weight is updated according to an hourly, daily, monthly, yearly, and/or any other periodic average and/or mean of the related retrievals. In such a manner, the weight of a web document that has been retrieved using a certain search parameter during a recent period may be higher than the weight of a web document that has been retrieved using a certain search parameter during a less recent period.

Each cluster tag is associated with a bundle of references of web documents which have been searched using common and/or related search parameters. The common and/or related search parameters indicate that the web documents, which are referred by references associated with the same cluster tag, are accessed from a similar and/or an identical responses page that is retrieved in response to one or more similar and/or identical search parameters. A certain set of search parameters is usually used from the same and/or similar motivations. For instance, the set of search parameters "reliable+DVD+player" is usually used by users who are interested in purchasing a reliable DVD player and therefore web documents which are accessed from a result entry of a responses page that is generated according to such a query may be a good platform for advertising a DVD player.

Optionally, such a clustering allows the operator of the system to offer advertisers a bundle of websites which are divided according to search parameters. In such a manner, the advertiser may associate her advertisement in web documents which are related to one or more search parameters that reflect the same and/or similar motivations. Optionally, an advertisement means an indication, such as a link, an address, an identifier, a serial number, or any other value or reference that can be used to for accessing and/or selecting an advertisement. The advertisement may be used for promoting one or more products which are related to one or more of the referred products and for driving the traffic of network users to documents that promote and/or offer for sale of these products. Optionally, as used herein, an advertisement also means a promotional content that is embedded in the content of a certain web document. In such an embodiment, the promotional content may be a segment of the document that is not allocated for advertisements, for example a product that appears in an image or a video clip, an article that review a product and/or a service, a story or an article that mentions the product, or any other format of indirect advertising.

The references in the database may be updated according to statistical analysis of the search parameters that have been used for creating the responses page that include the result entry the respond thereto.

As described above, the system 100 allows a user to associate an advertisement with a bundle of web documents which are accessed by users who used respective search parameters. Optionally, as shown at 202, the system 100 receives a description of a product, for example via the receiving module 101. The description may include keywords that describe the product and/or are associated with the product in a manner that allows retrieving related information, for example common misspelled related keywords, keywords that describe products of competitors, keywords that describe accessories to the product, and/or any other search parameter. Optionally, the description is a generic description that describes the type of the advertised product, for example "cameras" for an advertisement to a camera of a certain brand.

Now, as shown at 203, a match is identified between the product description and search parameters which are documented in the database and/or between the description and the cluster tags which are associated with such search parameters. The match may be performed automatically by matching the description with the documented search parameters or by allowing an advertiser and/or the system operator to select one or more cluster tags that match the description of the product.

Optionally, the matching module 103 searches the database 104 for references which are associated with search parameters which match the received description. Optionally, as shown at 204, the matched references are forwarded, optionally as a list, to an advertising server and/or as an output that allows the advertising of the described product, as shown at 205. Optionally, the system 100 is connected to one or more advertising servers 105 that host advertisements for one or more advertisers, optionally via a communication network 107, such as the Internet. The delivering of the advertisements to various web documents of various publishers or the delivering indications to these advertisements is managed by the system 100.

As described above, the system 100 may be designed for outputting the generated list of references of web documents. Optionally, the system 100 uses the advertisement server 105 for delivering advertisements which are related to the described product to web documents according to such a list. Optionally, the web documents are webpages in websites which are referred herein as publishers. Optionally, one or more webpages of each publisher are tagged with a script, such as an HTML script. The script calls one of the advertisement servers 105 whenever a request to load the hosting webpage is received. Such a request is referred to herein as a page impression. The call includes an identification of the sending webpage and/or the publisher. The advertisement server 105 optionally hosts one or more advertisements lists 318; each includes advertisements and/or links thereto. Each record of the advertisements lists 318 is associated with a member of the list that is outputted by the system 100. The advertisement server 105 matches the received list with the advertisements lists 318 and sends one or more advertisements to the matched advertisements.

As outlined above, the system 100 may be used for selecting advertisement spots which are positioned in communication content messages, such as short message service (SMS) messages, instant messaging (IM) messages, multimedia messaging service (MMS) messages, and wireless application protocol (WAP) messages. In such an embodiment, the advertisement spots may be an advertisement, or series of advertisements, for a certain product which are displayed in association with a communication content message that includes one or more identifiers of the certain product, such as keywords, as the aforementioned search parameters. In such a manner, the sender and/or the receiver of a communication content message may be designated to receive, optionally substantially concurrently, one or more advertisements to a product which is mentioned and/or implied in the content of the communication content message. As used herein, substantially concurrently means shortly before and/or after receiving the message, with the message, and/or shortly before and/or after sending the message. For example, a sender and/or a receiver of an SMS message that includes the following text: "Do you know where I can find a good camera for my trip to China" are designated to receive, optionally substantially concurrently, one or more SMS messages that includes promotional content and/or one or more coupons for one or more cameras and/or camera retailers, one or more traveling equipment items and/or traveling equipment agents, one or more traveling services in China and the like. In such an embodiment, the database 104 hosts a plurality of content identifier, such as words, paragraphs and/or links, which are optionally associated with references, to predefined bundles of users, such as users of a certain provider, users of a certain demographic segment, and/or users who signed an agreement. In such manner, promotional content may be sent to members of these bundles, as described above thereto. For example, a reference may be to group of users in the age group of 20 to 30. The matching module 103 performs the matching, substantially similarly to the manner described in relation to numeral 203 of FIG. 2A and/or as described below with reference to FIG. 2B.

Figure 2B:
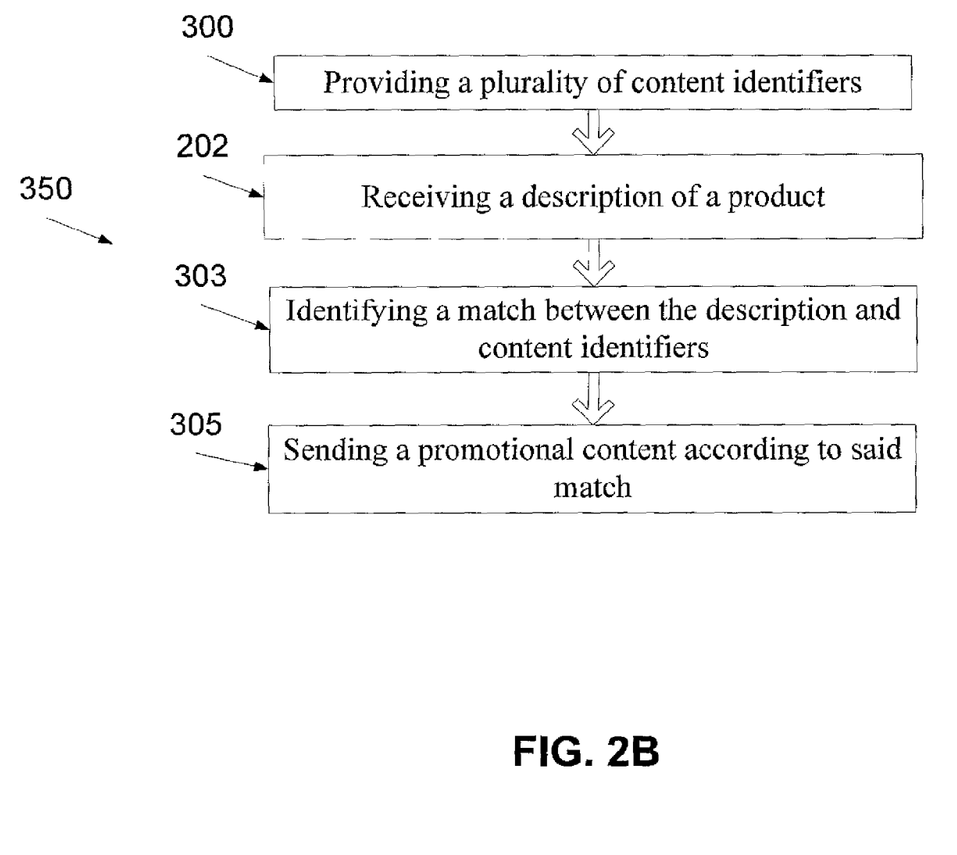
FIG. 2B is a flowchart of a method for advertising a product in a communication message, according to some embodiments of the present invention.

In such an embodiment, the system 100 further comprises the aforementioned receiving module 101 and the matching module 103 for generating a list that includes content identifiers that match the product's description in a similar manner of the aforementioned matching. Reference is now also made to FIG. 2B, which is a flowchart of a method 350 for, according to some embodiments of the present invention. Block 202 is similar to the described in relation to FIG. 2B. First, as shown at 300, a plurality of content identifiers are provided. For example, as described above, each content identifier is associated with bundles of users. Then, as shown at 202 and described above a description of a product is received. Now, as shown at 303, a match between the description and at least one of the plurality of content identifiers is found. Optionally, a match is identified between the product description and message content identifiers which are documented in the database. The match may be performed automatically by matching the description with the message content identifiers or by allowing an advertiser and/or the system operator to select one or more message content identifiers that match the description of the product. The match allows selecting references in a similar manner to the described above in relation to 204.

Now as shown at 305, promotional content pertaining to the product is sent to at least one of a sender and a receiver of a communication content message that includes the matched content identifier. For example, matched references may be forwarded, optionally as a list, to an advertising server of a service provider, such as a cellular network provider and/or an IM service provider. Optionally, the system 100 is connected to one or more advertising servers 105 that host advertisements for one or more advertisers, for example as described above. In such an embodiment, the output unit 102 is used for delivering the list to allow the presenting and/or associating of an advertisement to members of these bundles substantially concurrently to the sending and/or receiving one or more communication content messages that match the description of the product. In such a manner, the cellular network providers and/or IM service providers can add targeted advertisements to communication content messages of members of the bundles when identifying the respective content in them. In such a manner, the sender and/or the receiver of a communication content message that mentions and/or implies a certain content identifier may receive, optionally substantially concurrently, one or more targeted advertisements. In such an embodiment, the targeted advertisements are to a product having a description that matches the certain content identifier that is mentioned and/or implied in the received and/or sent communication content message. Optionally, data pertaining to the sender and/or receiver, for example data from the customer relationship management (CRM) of the service provider, may be used for personalizing the promotional content which is sent thereto.

Figure 4:
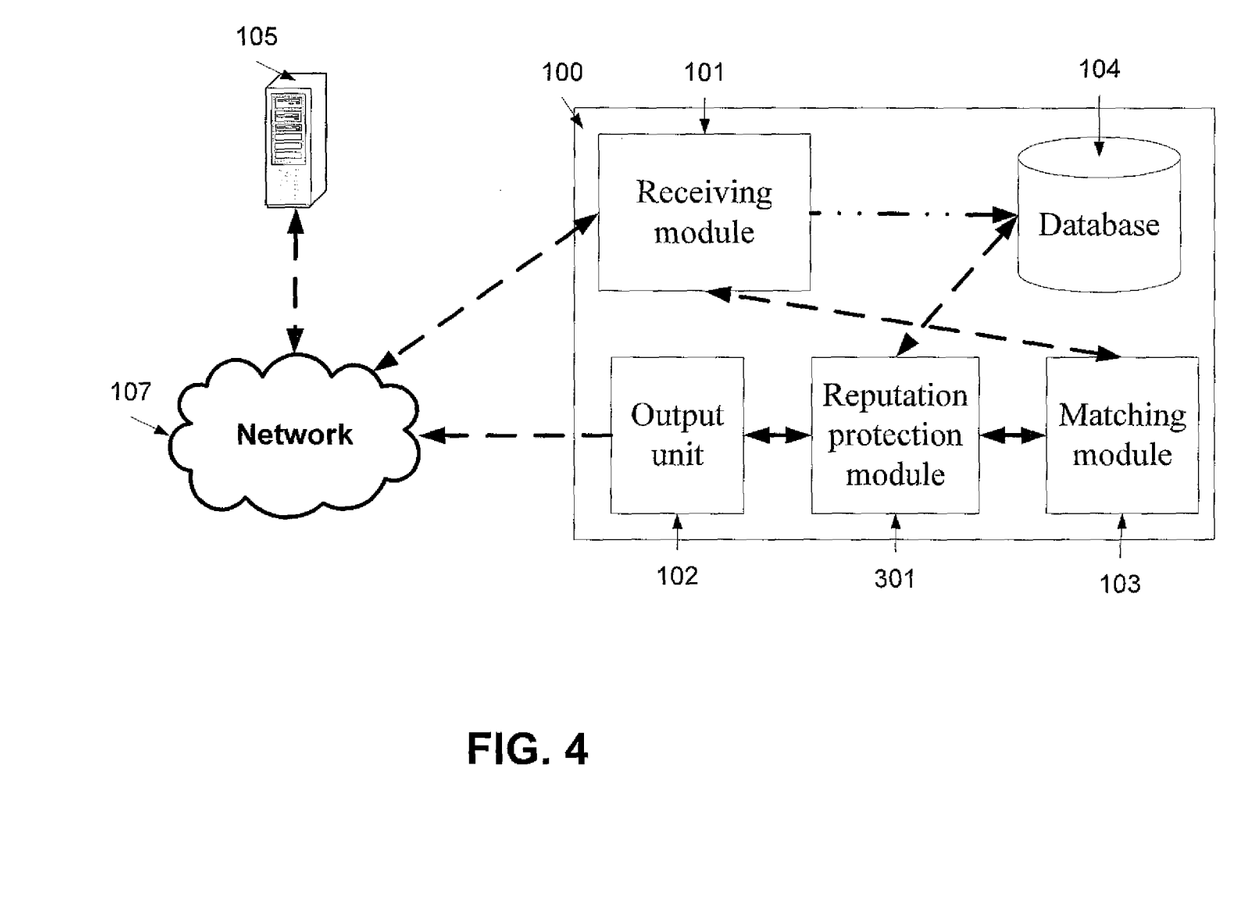
FIG. 4 is a schematic illustration of the system for selecting advertisement spots of FIG. 1 with a reputation protection module, according to some embodiments of the present invention.

Reference is now made to FIG. 4, which is a schematic illustration of the system 100, according to some embodiments of the present invention. The receiving module 101, the output module 102, the matching module 103, the network 107 and the database 104 are described in FIG. 1. However, the system further comprises a reputation protection module 301 for reducing and/or avoiding advertising in web documents that contain unsuitable content.

In order to increase the effectiveness of the advertisements, it may be advantageous for advertisers to associate what is being advertised with web documents that do not contain content that may undermine their marketing and/or labeling efforts.

For example, associating an advertisement to a certain soft drink, such as Coca Cola™, with a website that includes content that may be insulting to a certain segment of the population, may undermine the marketing and/or labeling efforts of the advertiser among this population. In another example, placing an advertisement to an exclusive product, such as a branded watch, in association with a website that includes content about where to buy counterfeits of the watch or with content the praise competitors' products may undermine the marketing and/or labeling efforts of the branded watch manufacturer.

As described above, the system 100 is designed to identify a cluster of references of web documents which are suitable to function as advertising sites for a certain advertisement. The references of the selected cluster have been tagged according to the search parameters which have been used by users to retrieve them and not according to their content and/or image. The reputation protection module 301 is designed to reduce the number of web documents that contain content that may undermine the marketing and/or labeling efforts of the advertiser. Such content may include pornography, hate speech, information that is unflattering with regard to the product to be advertised, its manufacturer, and/or affiliates.

Optionally, the reputation protection module 301 is connected to the receiving module and/or to any other input module that allows the advertiser and/or the system operator to input terms and/or concepts that should not be associated with a certain advertisement.

Figure 5:
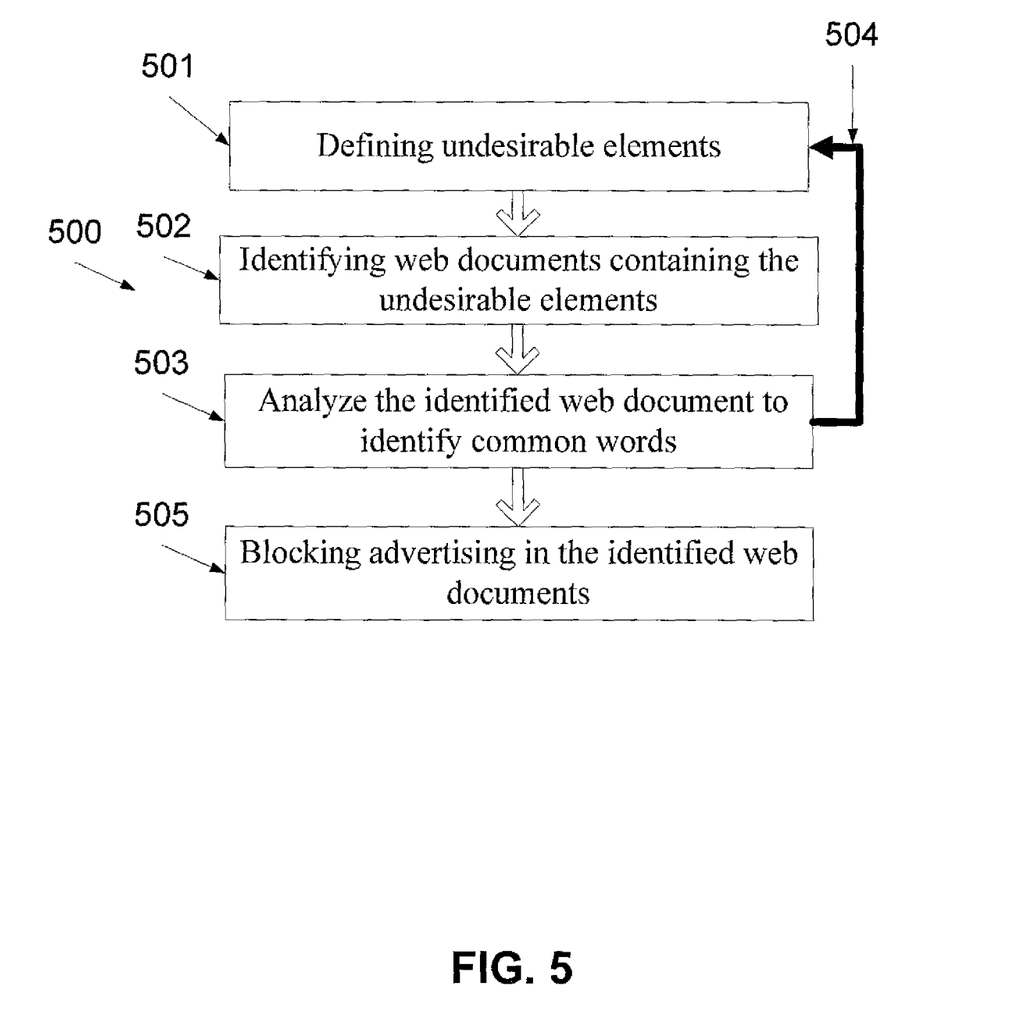
FIG. 5 is a flowchart of a method for identifying web documents with objectionable content, according to some embodiments of the present invention.

Reference is now made to FIG. 5, which is a flowchart of a method 500 for identifying web documents with objectionable content, according to some embodiments of the present invention. First, as shown at 501, a set of undesirable content elements is defined. As used herein, an undesirable element means a word, a paragraph, a sentence, an image, a file and/or a link, such as a URL. The selected undesirable content elements may include offensive words, negative references which are related to the sponsoring company, and discussion of competitors' products. Optionally, each one of the aforementioned cluster tags is associated with a list of undesirable content elements which is related thereto. For example, the cluster tag "medical service" is associated with a list of undesirable content elements that includes the words sloppy, dirty, disappointing, and dangerous and with the sentences "bad service" and "keep distance".

Now, as shown at 502, specific web documents, such as webpages, which may be regarded as undesirable, are identified according to the undesirable content elements and optionally tagged. Optionally, web documents, such as the documents which are referred to by the references in the aforementioned database are analyzed and scored according to the frequency of the undesirable content elements therein, according to the location of the undesirable content elements in the web document, and/or according to the visibility of the undesirable content elements therein.

Optionally, as shown at 503, the undesirable web documents are analyzed and terms which are found frequently are added to the set of undesirable content elements. Optionally, as shown at 504, blocks 501-503 are repeated with the updated set of undesirable content elements. Now, as shown at 505, the advertising in advertisement spots, which are associated with the identified web documents, is blocked. For example, sub web documents are omitted from a cluster of references of web documents for advertising, removed from the aforementioned database 104, and/or tagged as undesirable.

Optionally, in use, the system 100 selects a cluster of references of advertising spots in web documents, optionally as described above, and associates a certain advertisement therewith.

It is expected that during the life of a patent maturing from this application many relevant systems and methods for will be developed and the scope of the terms system, methods, networks, and web documents are intended to include all such new technologies a priori.

As used herein the term "about" refers to ±10%

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for selecting advertisement spots for promotional content pertaining to a product using a processor, comprising:

automatically browsing, by a crawler program, a network or any segment thereof in a methodical manner to identify a plurality of web documents having a plurality of advertising spots;

automatically extracting at a content analysis module, a plurality of content identifiers from a content of each of said plurality of web documents having said plurality of advertising spots according to a content analysis, said content is set to be displayed in association with respective said advertising spot, said content identifiers stored in a repository;

receiving, from an advertisement entity promoting or enhancing the exposure of browsing users to a certain product, a product description indicative of a plurality of properties of said product at a matching unit having a processor;

automatically identifying at said matching unit, a match between said product description and each member of an identified cluster of web documents selected from said plurality of web documents according to said plurality of content identifiers;

after said identifying said cluster of web documents, forwarding by at output unit, said cluster of web documents to an advertisement server; and selecting, by said advertisement server, specific promotional content pertaining to said certain product to be advertised to said browsing users who access a member of said cluster;

wherein said advertisement server provides each one of said plurality of browsing users with said specific promotional content in response to a request to load said member.

2. The computerized method of claim 1, wherein said product is selected from a group consisting of: a product, a service, a website, a movie, and a show.

3. The computerized method of claim 1, wherein said access consists of: a reference to a web document linking to said web document and a reference to a web document linked from said web document.

4. The computerized method of claim 1, wherein said extracting comprises, for each said plurality of content identifiers, estimating a relevancy weight of each said advertising spot, said identifying comprising generating said cluster according to respective said relevancy weights.

5. The computerized method of claim 4, wherein said extracting further comprises:
  tracing a plurality of referrers to a plurality of web documents; and
  weighting each said web document according to said tracing;
  wherein said estimating is performed according to said weighting.

6. The computerized method of claim 4, wherein said extracting further comprises analyzing content of a plurality of web documents, wherein said estimating is performed according to said analyzing.

7. The computerized method of claim 1, wherein said extracting further comprises:
  tracing a plurality of referrers to a plurality of web documents; and
  selecting said plurality of content identifiers according to said tracing.

8. The computerized method of claim 1, wherein said web document is selected from a group consisting of: a webpage, a video file, an audio file, a podcast, a word processor document, a portable document format (PDF) document, an excel spreadsheet document, an extensible markup language (XML) page, a hypertext markup language (HTML) page, and a content file being accessible via a communication network.

9. The computerized method of claim 1, wherein said extracting comprises clustering a plurality of websites in a plurality of clusters each said cluster being associated with at least one of said plurality of content identifiers and being identified from said plurality of clusters according to a match between said product description and said at least one associated content identifier.

10. The computerized method of claim 9, wherein each said cluster indicating a product type, each said website being clustered according to a match between said respective at least one content identifier and a respective said product type, said selecting being perform from said plurality of clusters.

11. The computerized method of claim 1, wherein said extracting further comprises providing a list of a plurality of undesirable content elements, said identifying comprises identifying a match between said plurality of undesirable content elements and at least one content element of each said web document.

12. The computerized method of claim 11, wherein said undesirable content element is selected from a group consisting of: an objectionable word, an objectionable paragraph, an objectionable image, an objectionable phrase, and an objectionable word combination.

13. The computerized method of claim 11, further comprising identifying at least one additional undesirable content element in each said web document by analyzing a sub-group of each said web document, each member of said sub-group having at least one of the said plurality of undesirable content elements, said identifying being performed according to a match between said at least one additional undesirable content and at least one content element of each said web document.

14. The method of claim 1, wherein said product description has at least one term in excess to said promotional content.

15. The method of claim 1, wherein at least one of said plurality of properties of a product is absent from said promotional content.

16. A computerized method for selecting advertisement spots for promotional content pertaining to a product using a processor, comprising:
  automatically browsing, by a crawler program, a network or any segment thereof in a methodical manner to identify a plurality of web documents having a plurality of advertising spots;
  associating, between a plurality of references of said plurality of web documents and a plurality of content identifiers automatically extracted at a content analysis module, each said web document being associated according to a content analysis of a content thereof which is set to be displayed in association with at least one advertisement of said plurality of advertising spots;
  receiving, from an advertisement entity promoting or enhancing the exposure of browsing users to a certain product, a product description indicative of a plurality of properties of said product at a matching unit having the processor;
  automatically selecting at said matching unit a cluster of references from said plurality of references according to a match between said product description and said plurality of content identifiers using said matching unit;
  after selecting said cluster of references, forwarding said cluster of references to an advertisement server; and
  selecting, by said advertisement server, specific promotional content pertaining to said certain product to be advertised to said browsing users who access a member of said cluster;
  wherein said advertisement server provides each one of said plurality of browsing users with said specific promotional content in response to a request to load said member.

17. A system having a processor for selecting advertisement spots, comprising:
  a crawler program configured to browse a network or any segment thereof in a methodical manner to identify a plurality of web documents having a plurality of advertising spots;
  a repository which stores for each of said plurality of web documents a plurality of content identifiers which are automatically extracted at a content analysis module by a content analysis of a content thereof which is set to be displayed in association with at least one advertisement of said plurality of advertising spots;
  a receiving unit configured for receiving, from an advertisement entity promoting or enhancing the exposure of browsing users to a certain product, a product description indicative of a plurality of properties of said product;
  a matching unit which uses the processor for automatically identifying a match between said product description and at least one of said plurality of content identifiers; and
  an output unit which generates each member of a cluster of web documents according to said match and after generating said cluster of web documents, forwards a list of web document advertisement spots to an advertisement server, each member of said list of web document advertisement spots being associated with said at least one content identifier;

wherein said advertisement server selects specific promotional content pertaining to said certain product to be advertised to said browsing users who access a certain web document of said plurality of web documents, said certain web document having at least one member of said list of advertisement spots;

wherein said advertisement server provides each one of said browsing users with said specific promotional content in response to a request to load said certain web document.

18. The system of claim 17, further comprising at least one tracing module configured for tracing a plurality of referrers to a plurality of web documents and weighting each said web document according to said tracing, wherein said list of advertisement spots is generated according to said weighting.

19. The system of claim 17, wherein said content analysis module is configured for analyzing a content of said web document, said matching unit being configured for identifying a match between at least one of said product description and said at least one content identifier and said content.

20. The system of claim 17, further comprising a reputation protection module configured for probing a plurality of undesirable content elements in said web document, said output module unit being configured for filtering said list of advertisement spots according to said probing.

21. The system of claim 17, wherein said repository maps an ad exchange network.

22. The system of claim 17, wherein said output unit being configured for forwarding said list of references to an advertising server for allowing the advertising of said product in at least one web document referred to by said list of advertisement spots.

23. A computerized method for advertising according to a content of communication content messages using a processor, comprising:

automatically browsing, by a crawler program, a network or any segment thereof in a methodical manner to identify a plurality of web documents having a plurality of advertising spots;

providing a plurality of content identifiers associated with a plurality of references of said plurality of web documents according to content analysis of a content of said plurality of web documents which is set to be displayed in association with at least one advertisement of said plurality of advertising spots, said content identifiers automatically extracted at a content analysis module;

receiving, from an advertisement entity promoting or enhancing the exposure of at least one of a sender and a receiver to a certain product, a product description indicative of a plurality of properties of said product at a matching unit having the processor;

automatically identifying a match between said product description and at least one of said plurality of content identifiers using said matching unit; and sending specific promotional content pertaining to said certain product description to at least one of a sender and a receiver of a communication content message including at least one of matched said plurality of content identifiers;

wherein said communication content message comprises a member of a group consisting of a short message service (SMS) message, an instant messaging (IM) message, a multimedia messaging service (MMS) message, and a wireless application protocol (WAP) message.

24. The computerized method of claim 23, wherein said plurality of content identifiers comprises at least one member of a group consisting of a word, a paragraph, a link, a combination of paragraphs and a combination of words.

25. The computerized method of claim 23, wherein said sending is performed concurrently to at least one of a sending of said communication content message and a receiving of said communication content message.

26. The computerized method of claim 23, wherein said sending comprises personalizing said promotional content according to at least one characteristic of said at least one sender and receiver.

27. A computerized method for advertising according to content analysis, comprising:

automatically browsing, by a crawler program, a network or any segment thereof in a methodical manner to identify a plurality of web pages having a plurality of advertisement spots;

receiving a plurality of certain product descriptions from an advertising entity promoting or enhancing the exposure of browsing users to certain products;

automatically analyzing at a content analysis module, a textual content of each one of said plurality of web pages to identify a plurality of content identifiers;

clustering said plurality of web pages in a plurality of clusters by adding each one of said plurality of web pages to one of said plurality of clusters according to respective said plurality of content identifiers;

automatically associating at a matching unit said plurality of clusters of web pages with said plurality of product descriptions;

after creating said cluster of web documents, selecting specific promotional content for each one of said plurality of clusters according to a match with respective associated certain product description from said plurality of certain product descriptions.

* * * * *

UNITED STATES PATENT AND TRADEMARK OFFICE
CERTIFICATE OF CORRECTION

PATENT NO. : 9,117,219 B2
APPLICATION NO. : 12/347027
DATED : August 25, 2015
INVENTOR(S) : Amiad Solomon et al.

Page 1 of 1

It is certified that error appears in the above-identified patent and that said Letters Patent is hereby corrected as shown below:

Title Page,

Item (75) Inventors, line 2,

Change "Moshe Koppel, Efrat (IE)"

to

--"Moshe Koppel, Efrat (IL)"--

Signed and Sealed this
Tenth Day of May, 2016

Michelle K. Lee
*Director of the United States Patent and Trademark Office*